United States Patent [19]

Ycas

[11] Patent Number: 4,519,060
[45] Date of Patent: May 21, 1985

[54] DISC LATCHING MECHANISM

[75] Inventor: John A. Ycas, Boulder, Colo.

[73] Assignee: Reference Technology, Boulder, Colo.

[21] Appl. No.: 556,507

[22] Filed: Nov. 29, 1983

[51] Int. Cl.³ .............................................. G11B 5/82
[52] U.S. Cl. ................................................. 369/77.2
[58] Field of Search ...................... 369/77.2; 206/309; 360/133

[56] References Cited

U.S. PATENT DOCUMENTS

| | | | |
|---|---|---|---|
| 4,239,238 | 12/1980 | Coleman | 369/77.2 |
| 4,352,174 | 9/1982 | Tajima et al. | 369/77.2 |
| 4,439,850 | 3/1984 | Takahara et al. | 369/77.2 |

FOREIGN PATENT DOCUMENTS

| | | | |
|---|---|---|---|
| 56-74873 | 6/1981 | Japan | 369/77.2 |
| 2085213 | 4/1982 | United Kingdom | 369/77.2 |

Primary Examiner—Steven L. Stephan
Attorney, Agent, or Firm—Townsend and Townsend

[57] ABSTRACT

A latching mechanism for an optical disc system using an optical disc mounted in a disc carrier, the disc carrier and disc housed within a protective cartridge. A spring biased rotary cam in the disc drive includes an eccentric pin at its outer end which engages a spring biased catch member on the disc carrier during insertion of the cartridge. The cam has a cam groove formed in its outer surface having alternating spiral and axial segments. During the initial insertion of the cartridge, the rotary cam rotates as it is driven axially by the disc carrier causing the eccentric pin to move the catch member laterally. This disengages the catch member from the cartridge and places a second projection on the catch member in line with a laterally projecting lip within the disc drive. When the cartridge is retracted, the rotary cam moves axially until the second projection and lip contact so further movement of the cartridge leaves the disc carrier within the disc drive. During reinsertion of the empty cartridge, the rotary cam moves axially and rotates to move the catch member laterally so it becomes offset from the lip and reengages the cartridge. Withdrawal of the cartridge and disc carrier proceeds with the rotary cam moving axially along the other axial cam groove segment.

13 Claims, 7 Drawing Figures

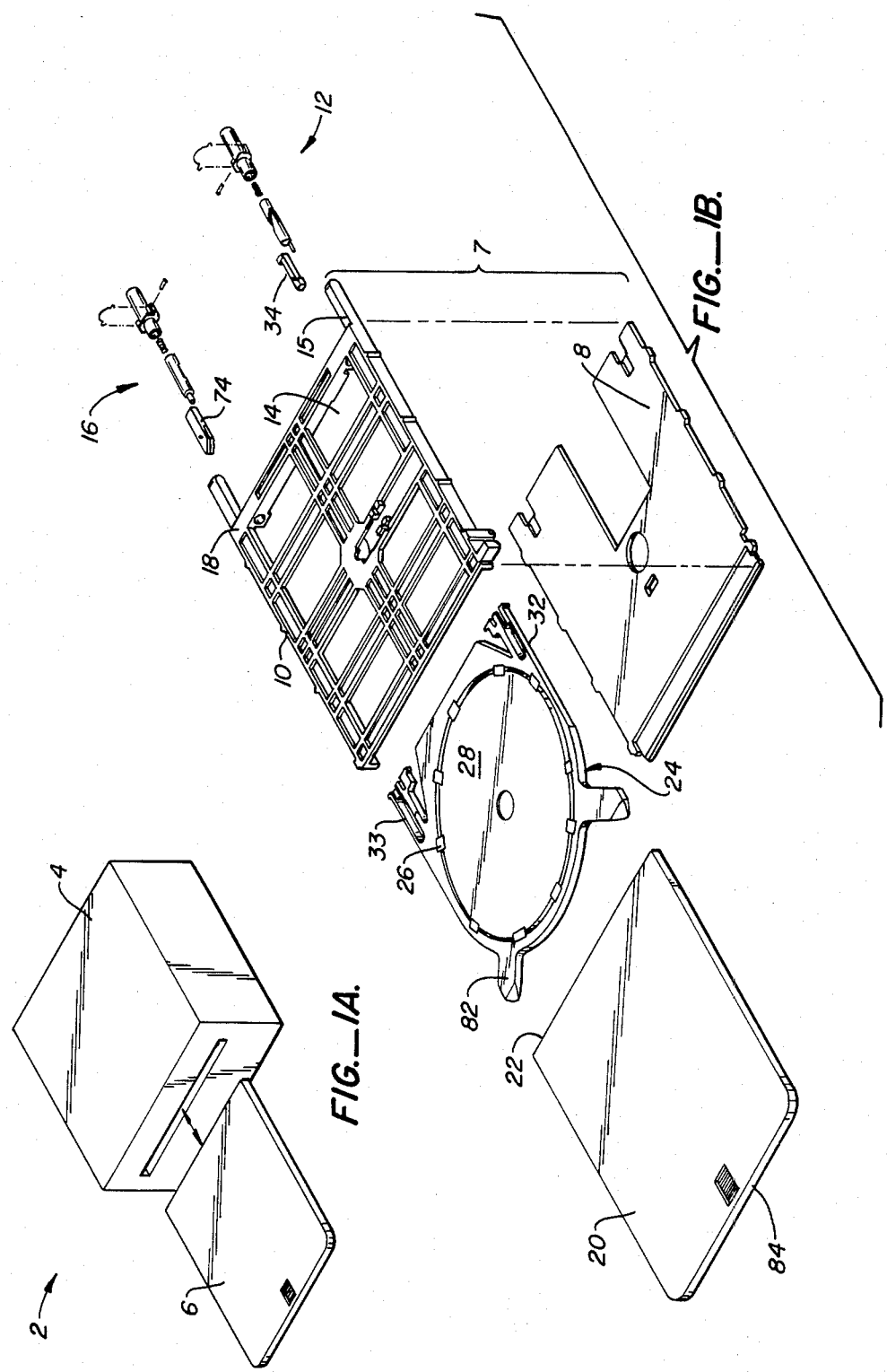

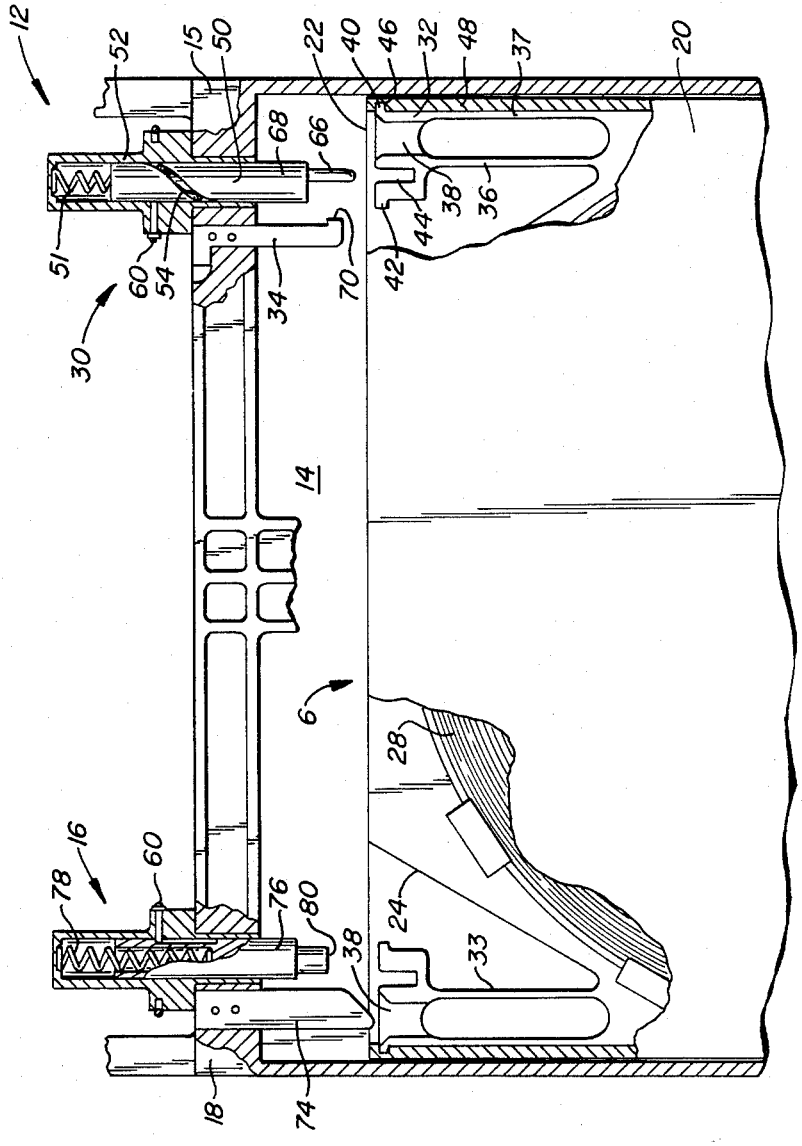
FIG._2.

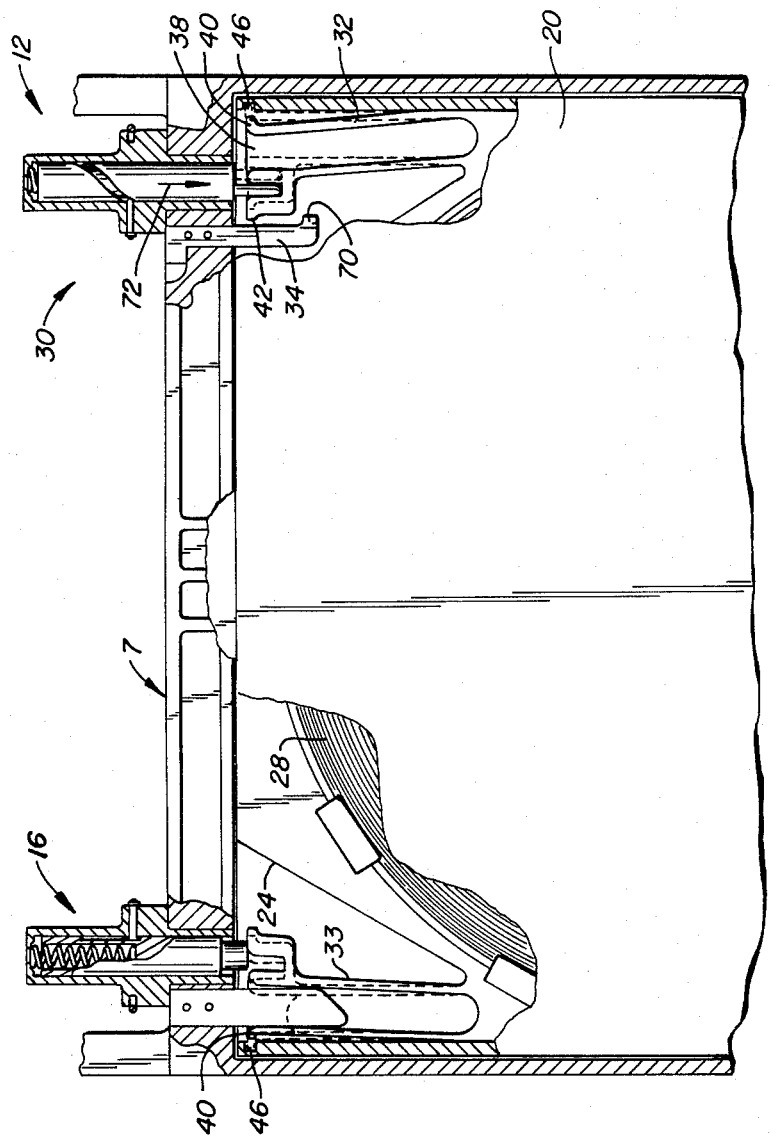
FIG._3.

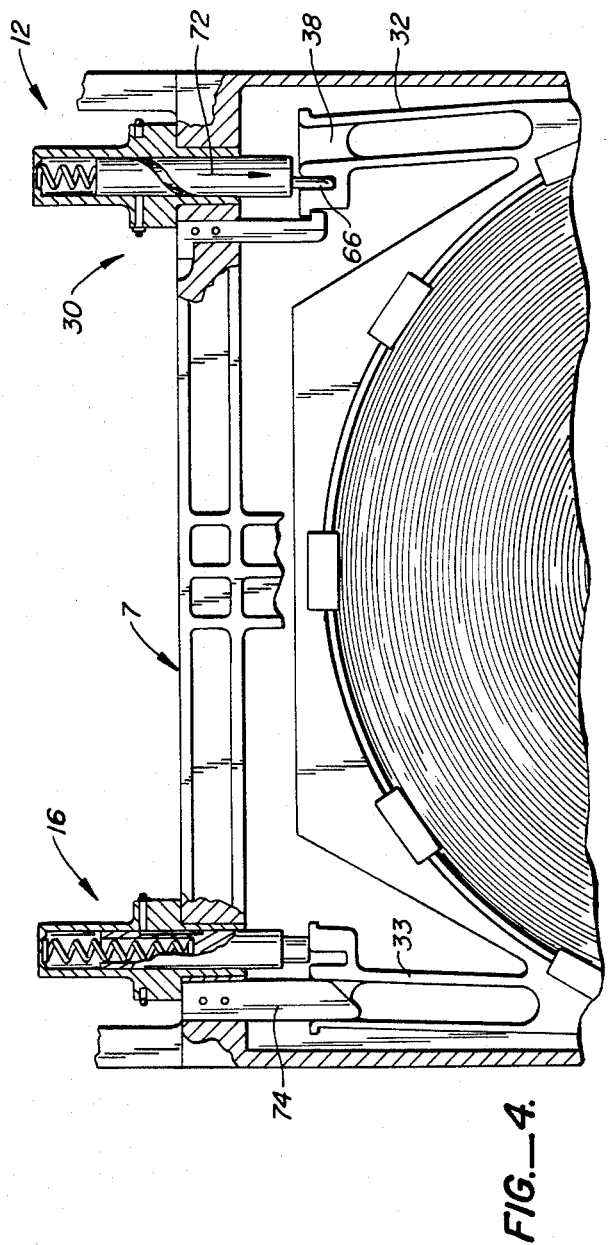
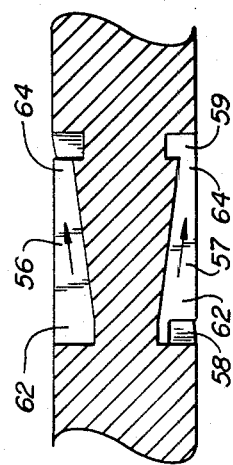
FIG._4.
FIG._5.

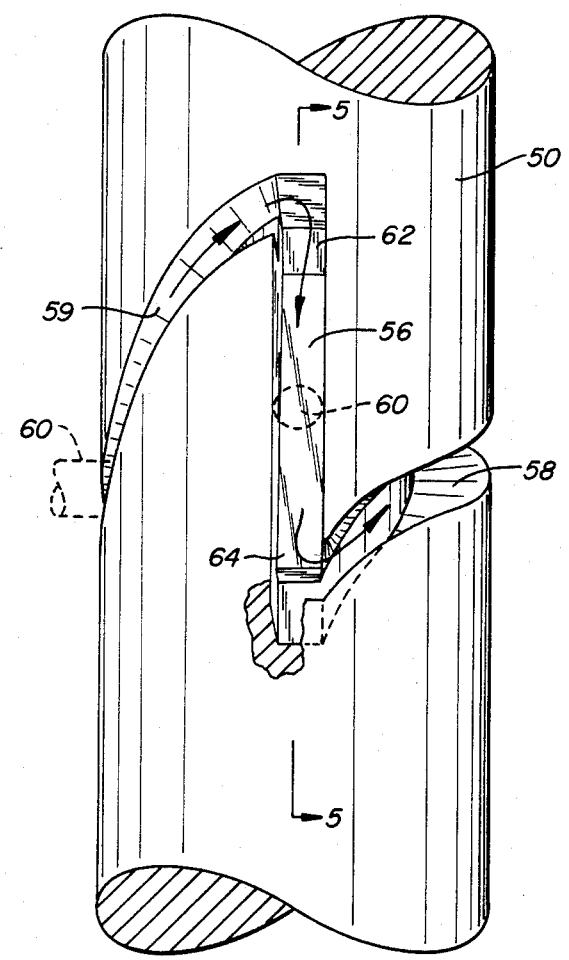
FIG._6.

DISC LATCHING MECHANISM

BACKGROUND OF THE INVENTION

Optical discs, often referred to as laser discs, have become quite popular as a consumer item for viewing movies at home. Optical discs are also being used for the permanent storage of information in computer based applications.

One problem associated with optical discs is that their surfaces must be kept very clean, or else erroneous data will be read by the disc drive. Although this problem may not be critical for optical discs used for showing movies, in computer applications the quality of the information is critical. Therefore, all sources of erroneous information must be minimized to make optical discs suitable for these applications.

One way to aid cleanliness is to keep the disc within its protective cartridge whenever outside the disc drive and to provide for the automatic removal of the disc from the cartridge upon insertion of the cartridge into the disk drive. One way of doing this has been by the use of complicated linkage mechanisms to actuate the various components during the various insertion, retraction, reinsertion and withdrawal stops. These mechanisms, because of their complexity, can be difficult and thus costly to manufacture.

SUMMARY OF THE INVENTION

The present invention is directed to a latching mechanism for a removable media optical disc system of the type using an optical disc mounted for rotation in a disc carrier, the combination disc carrier and disc housed within a protective cartridge. The disc containing cartridge is inserted into the optical disc drive. When fully inserted, a rotary cam assembly, including an eccentric pin at its outer end, engages a spring biased catch member on the disc carrier. The axial insertion of the cartridge and disc carrier into the disc drive causes the rotary cam member to be driven axially against a spring.

The cam member has a cam groove formed in its outer surface within which the end of a spring biased guide pin is positioned. The cam groove includes alternating spiral segments and two axial segments. The segments are configured so that during the initial insertion of the cartridge and disc carrier, the rotary cam rotates as it is driven axially against the spring by the disc cartridge. This rotation causes the eccentric pin to move the catch member laterally. This lateral movement disengages one projection on the catch member from a complementary slot on an inner wall of the cartridge, thus releasing the disc carrier from the cartridge. This lateral movement of the eccentric pin also places a second projection on the catch member in line with a laterally projecting lip on a disc carrier stop, which is mounted to the disc drive.

When the cartridge is retracted from the disc drive, the rotary cam moves axially, but does not rotate thus keeping the catch member biased so the second projection stays aligned with the lip. When the second projection and lip contact, further movement of the cartridge out of the disc drive leaves the disc carrier and disc within the disc drive. Thus the lip on the disc carrier stop both keeps the disc carrier in the disc drive upon retraction of the cartridge and also properly positions the disc within the disc drive.

To remove the disc carrier and disc, the empty cartridge is reinserted into the disc drive. During reinsertion, the rotary cam is again pushed axially against its biasing spring and also rotates due to the engagement of the guide pin in the other spiral cam groove segment. This moves the catch member laterally so that the first projection once again engages the slot within the interior of the cartridge and the second projection is no longer aligned with the lip of the disc carrier stop. Withdrawal of the cartridge and disc carrier as a unit from the disc drive proceeds with the rotary cam moving axially along the other axial cam groove segment.

As used in this patent application, insertion means to place a disc containing cartridge into the disc drive unit; retraction is the removal of an empty cartridge from the empty drive unit leaving the disc and disc carrier within the drive unit; reinsertion is the placing of the empty cartridge back into the drive unit for reengagement around the disc carrier; and withdrawal is the removal of the cartridge and disc and disc carrier from the drive unit. In the preferred embodiment, the catch member is mounted on one side of the disc carrier. For smooth operation, a second catch member is mounted to the other side of the disc carrier as well. Although a latching mechanism made according to the invention could be used with both catch members, this is has not been found to be necessary. Rather, a releasing guide is used to bias the catch member inwardly during all four insertion, retraction, reinsertion and withdrawal steps. An equalizing plunger, which engages the second catch member, provides a spring force on the catch member generally equal to the spring force provided by the spring loaded rotary cam. This aids the smooth operation of the system.

The cam groove is configured so that the rotary cam rotates in only a single direction. This is accomplished by forming the axial cam groove segments with sloped or inclined bottoms while the spiral segments have a constant depth. The entrance ends of the axial segments are somewhat deeper than the spiral segments and then taper upwardly to their exit ends, which are shallower than the adjacent spiral groove. This insures that the spring biased guide pin does not back up along the cam groove during any of the reciprocating movements of the rotary cam.

A primary feature of the present invention is its use of the spring loaded, unidirectional rotary cam coupled with an eccentric pin to provide a lateral movement of the catch member during alternate load and unload steps. The catch member includes projections which both secure the disc carrier within the protective cartridge and within the disc drive. The resulting latching mechanism is relatively simple in construction, low in cost and yet provides accurate and trouble-free operation.

Other features and advantages of the invention will appear from the following description in which the preferred embodiment has been set forth in detail in conjunction with the accompanying drawings.

BRIEF DESCRIPTION OF THE DRAWINGS

FIG. 1A is a simplified representation of the optical disc system of the invention.

FIG. 1B is an exploded isometric view showing a cartridge, a disc carrier with a disc, a drive unit frame and a cam assembly made according to the invention.

FIG. 2 is an enlarged top view of the embodiment of FIG. 1A during insertion of the cartridge and disc carrier into the drive unit.

FIG. 3 is a view similar to FIG. 2 at the end of the insertion step.

FIG. 4 is a view similar to that of FIG. 2 at the end of the retraction step showing the cartridge removed.

FIG. 5 is a cross-sectional view of the rotary cam taken in the plane of the paper in FIG. 2 and along line 5—5 of FIG. 6 showing the variation and groove depth of the axial cam groove segments.

FIG. 6 is a isometric view of the rotary cam illustrating the cam groove segments and showing the engagement of the guide pin, shown in dashed lines, at various positions.

DETAILED DESCRIPTION OF THE PREFERRED EMBODIMENT

FIGS. 1A and 1B show an optical disc system 2 including a disc drive 4 for use with a disc cartridge assembly 6. Disc drive 4 includes a frame assembly 7 made up of a lower frame 8 and an upper frame 10 configured to house disc cartridge 6 when inserted within frame assembly 7. A cam assembly 12 is mounted to upper frame 10 at a corner 15 and extends into the region 14 between lower and upper frames 8, 10. An equalizer assembly 16 is also mounted to upper frame 10 on the corner 18 of frame assembly 7 opposite cam assembly 12.

Referring also to FIG. 2, cartridge assembly 6 includes a protective cartridge 20, which is substantially sealed except for open end 22 and a disc carrier 24 having a number of tabs 26 which support a disc 28 for rotation within disc carrier 24. Carrier 24 is sized to fit completely within protective cartridge 20 so that manual handling of disc cartridge assembly 6 will not damage disc 28.

Disc carrier 24 with disc 28 therein is automatically retained in and removed from drive unit 4 through the action of a latching mechanism 30. Latching mechanism 30 includes generally a catch member 32 extending from disc carrier 24, cam assembly 12, and a disc carrier stop 34 mounted to upper frame 10 adjacent cam assembly 12. Catch member 32 includes a pair of parallel spring legs 36, 37 which connect an outer end 38 of catch member 32 to disc carrier 24. Outer end 38 includes first and second lateral projections 40, 42 and a vertical slot 44. Spring legs 36, 37 bias outer end 38 outwardly so that first projection 40 engages a slot 46 formed in an edge 48 of protective cartridge 20. This keeps disc carrier 24 and disc 28 therewith secured within protective cartridge 20.

Cam assembly 12 includes a spring loaded rotary cam 50 mounted for both axial and rotary motion within a housing 52. Rotary cam 50 is biased by a spring 51 and includes a cam groove 54, shown in FIGS. 5 and 6, having straight segments 56, 57 and spiral segments 58, 59, the straight segments alternating with the spiral segments to form a continuous cam groove 54. A spring biased guide pin 60 guides the rotary and axial movement of rotary cam 50.

As will become clear below, it is desired that rotary cam 50 rotate in a single rotary direction, that is either clockwise or counterclockwise. To insure this occurs, straight segments 56, 57 have a variable depth while spiral segments 58, 59 have a constant depth. The entrance ends 62 of straight segments 56, 57 are somewhat deeper than spiral segments 58, 59. Straight segments 56, 57 taper upwardly from their entrance ends 62 so that their exit ends 64 are higher than the adjacent spiral segments 58, 59. This keeps guide pin 60 from moving backwards along cam groove 54.

An eccentric pin 66 is mounted to an end 68 of rotary cam 50. Pin 66 is located to engage slot 44 in outer end 38 of catch member 32 when disc cartridge assembly 6 is inserted into disc drive 4. During insertion of disc cartridge assembly 6, open end 22 presses against end 68 of rotary cam 50 thus compressing spring 51. During insertion of assembly 6, guide pin 60 engages spiral cam groove segment 58 causing rotary cam 50 to rotate approximately 180°. This moves eccentric pin 66 from the position of FIG. 2 to the position of FIG. 3. This removes first projection 40 from slot 46 against the outward bias of spring legs 36, 37.

In the position of FIG. 3, second projection 42 is axially aligned with a laterally extending lip 70 of disc carrier stop 34. During the subsequent retraction of disc cartridge assembly 6, rotary cam 50 moves in the direction of arrow 72 while guide pin 60 engages straight cam segment 56. Since during retraction rotary cam 50 does not rotate, eccentric pin 66 acts to keep outer end 38 biased to the left as shown in FIGS. 3 and 4 so that second projection 42 abuts lip 70. This halts the movement of disc carrier 24 and disc 28 carried therein but allows protective cartridge 20 to be removed from drive unit 4. Lip 70 is positioned within drive unit 4 so that when disc carrier 24 is in the position of FIG. 4, disc 28 is properly positioned within drive unit 4.

A catch member 33, mounted to corner 18 of upper frame 10, is the mirror image of catch member 32. During the insertion and retraction steps, outer end 38 of catch member 33 is biased inwardly by a releasing guide 74, as shown in FIGS. 3 and 4 to disengage projection 40 from slot 46. Thus, projection 40 helps to secure disc carrier 24 within protective cartridge 20 outside of disc drive 4 but is rendered inoperative during the various insertion, retraction, reinsertion and withdrawal steps. Equalizer assembly 16 includes a plunger 76 biased by a spring 78. The outer end 80 of plunger 76 engages outer end 38 of catch member 33 so that both corners of assembly 6 are subjected to approximately equal spring forces to aid smooth operation of disc drive assembly 2.

To remove disc carrier 24 from disc drive 4, an empty protective cartridge 20 is reinserted into disc drive 4 over carrier assembly 24. During this reinsertion, catch member 32 moves from its position of FIG. 4 to a position shown in dashed lines in FIG. 3 while guide pin 60 moves along spiral cam groove segment 59. Disc carrier 24 begins its movement from its position of FIG. 4 to the position of FIG. 3 when carrier guide tabs 82 engage the closed outer end wall 84 of cartridge 20 so that continued movement of cartridge 20 in the direction opposite arrow 72 drives cam 50 in the same direction thus compressing spring 51.

The unloading step is completed by withdrawing protective cartridge 20. As cam 50 extends in the direction of arrow 72, guide pin 60 engages axial cam groove segment 57 to keep projection 40 reengaged within slot 46 and to allow projection 42 to move past lip 70 to allow the complete disc cartridge assembly to be moved from disc drive 4.

Briefly stated, an operator inserts a disc 28 into disc drive 4 by simply inserting a disc cartridge assembly 6 into disc drive 4 and then removing protective cartridge 20. Similarly, to remove a disc 28, an empty protective cartridge 20 is fully reinserted into disc drive 4 and then withdrawn bringing disc 28 with it. Disc 28 is, however, fully protected by protective cartridge 20 whenever it is outside disc drive 4 and is never directly handled during loading or unloading processes.

In use a disc cartridge assembly 6, including a protective cartridge 20 and a disc carrier 24 carrying a disc 28 therein is inserted into region 14 within frame assembly 7. As disc carrier 24 engages eccentric pin 66 and slides rotary cam 50 in the direction opposite arrow 72, cam 50 rotates. As cam 50 rotates, eccentric pin 66 moves outer end 38 towards the center of carrier 24 causing first projection 40 to disengage from slot 46 and cartridge 20. Similarly, during insertion of cartridge assembly 6, releasing guide 74 moves catch member 33 inwardly causing projection 40 to disengage from slot 46.

After cartridge assembly 6 has been completely inserted into disc drive 4, protective cartridge 20 is retracted as shown by FIGS. 3 and 4. During this retracting step, cam 50 does not rotate because guide pin 60 is engaging straight cam groove segment 56. Cam 50 follows cartridge 20 until cam 50 is fully extended. At this time, second projection 42 engages lip 70 of disc carrier stop 34. As protective cartridge 20 is retracted, catch member 33 is pushed outwardly by plunger 76. When cartridge 20 is fully withdrawn, disc 28 and disc carrier 24 remain in disc drive 4.

To remove a disc 28 and disc carrier 24 from disc drive 4, an empty cartridge 20 is inserted into the disc drive. Cartridge 20 is guided within frame assembly 7 by its interior shape so that disc carrier 24 is automatically aligned with open end 22 of cartridge 20. As cartridge 20 is pushed into disc drive 4, end 22 of cartridge 20 presses on cam 50. Cam 50 moves in the direction opposite arrow 72 and rotates so eccentric pin 66 moves outer end 38 laterally away from the center of disc carrier 24. At this point projection 40 is repositioned into slot 46 so disc carrier 24 and disc 28 therein are locked into protective cartridge 20 allowing assembly 6 to be removed from disc drive 4 as a unit.

In its broadest form, the present invention provides a mechanism by which catch member 32 is moved in opposite lateral directions during alternate insertion steps while maintaining catch member 32 in the appropriate lateral position during all retraction/withdrawal steps. The same element, that is catch member 32 is used to both lock disc carrier 24 within cartridge 20 and also within disc drive 4. This arrangement eliminates the need for the complex linkage trains found in conventional optical disc drive units. Therefore in its broadest sense, the present invention may be practiced using other alternate latching mechanisms in lieu of spring loaded rotary cam 50. Also, a single catch member 32 could be mounted at the center of the front edge of disc carrier 24. However, if biasing is provided by structure similar to spring legs 36, 37, this, although eliminating many off axis forces, may cause the disc cartridge assembly to be much longer. Also, other types of biasing means may be used in lieu of spring legs 36, 37.

Modification and variation can be made to the disclosed embodiment without departing from the subject invention as defined in the following claims.

I claim:

1. A disc latching mechanism for use with a disc system of the type including a disc drive, a disc mounted for rotation within a disc carrier, the disc carrier and disc temporarily housed within a protective cartridge when outside of the disc drive, the mechanism comprising:
   a catch member mounted to the carrier and biased in a first direction to a first position;
   a catch member actuator mounted within the disc drive and positioned to engage said catch member when the protective cartridge, and the disc carrier and disc therewith, is inserted into the disc drive, said actuator arranged and adapted to bias said catch member in a second direction to a second position during insertion of said disc carrier and to maintain said catch member in said second position when the protective cartridge is retracted from the disc drive;
   a carrier stop mounted to the disc drive and positioned to engage said catch member when said catch member is in said second position to prevent the retraction of the disc carrier as the cartridge is retracted from the disc drive; and
   said catch member actuator including a rotatable cam member mounted for axial movement between retracted and extended positions, said cam member including a circumferential cam groove having first, second, third and fourth groove segments, said first and third groove segments arranged and adapted to rotate said cam member in a first rotary direction during said respective insertion and reinsertion of said cartridge, said second and fourth groove segments arranged and adapted to maintain a generally constant rotary orientation of said cam member during said retraction and withdrawal of said cartridge, said cam member eccentrically coupled to said catch member to move said catch member from said first position to said second position during insertion of said cartridge and from said second position to said first position during reinsertion of said cartridge and to maintain said catch member in said second position during retraction and withdrawal of said cartridge so when the cartridge is withdrawn from the disc drive the disc carrier is withdrawn from the disc drive along with the cartridge.

2. The disc latching mechanism of claim 1 wherein said first and third grooves are spiral grooves and said second and fourth grooves are axial grooves.

3. The disc latching mechanism of claim 2 wherein at least some of said grooves have different depths.

4. The disc latching mechanism of claim 3 wherein:
   said grooves have entrance and exit ends, said entrance end of each said groove being adjacent said exit end of the adjacent groove, said entrance ends being deeper than the adjacent exit ends; and
   said catch member actuator includes a spring biased guide pin having an outer end engaged within said cam groove, whereby said rotatable cam member rotates in only a single rotary direction during insertion, retraction, reinsertion and withdrawal of the protective cartridge into and from the disc drive.

5. The disc latching mechanism of claim 4 wherein said second and fourth straight segments taper upwardly from said entrance ends to said exit ends.

6. The disc latching mechanism of claim 1 wherein said catch member includes an elongate spring leg having an outer end configured for operable engagement with said catch member actuator.

7. The disc latching mechanism of claim 1 wherein said catch member includes a lateral projection and said carrier stop includes a laterally extending lip positioned to engage said lateral projection when the cartridge is retracted from the disc drive.

8. The disc latching mechanism of claim 1 wherein the carrier includes a plurality of catch members mounted to the disc carrier.

9. The disc latching mechanism of claim 8 including an equalizer assembly mounted within the disc drive and positioned and adapted to engage one of the catch members during insertion of the disc carrier into the disc drive.

10. A disc system comprising:
a disc drive;
a disc carrier;
a disc mounted for rotation within said disc carrier to form a disc carrier combination;
a protective cartridge temporarily housing the disc carrier combination when outside of the disc drive;
a catch member mounted to the disc carrier and biased in a first direction to a first position;
said catch member and protective cartridge including complementary engagable members engagable to maintain said disc carrier within said protective cartridge when said catch member is in said first position;
a catch member actuator mounted within the disc drive and positioned to engage said catch member when the protective cartridge and the disc carrier combination therewith is inserted into the disc drive, said actuator including a rotatable cam member mounted for axial movement between retracted and extended positions, said cam member including a circumferential cam groove having first, second, third and fourth groove segments, said first and third groove segments arranged and adapted to rotate said cam member in a first rotary direction during insertion and reinsertion of said cartridge into said disc drive, second and fourth groove segments arranged and adapted to maintain a generally constant rotary orientation of said cam member during said retraction and withdrawal of said cartridge from said disc drive, said cam member including an eccentrically mounted, axially extending protrusion positioned to engage said catch member and to move said cam member between said first and second positions during insertion and reinsertion of said cartridge;
a carrier stop mounted to the disc drive and positioned to engage said catch member when said catch member is in said second position to prevent the retraction of said disc carrier combination as the cartridge is retracted from the disc drive; and
said actuator arranged and adapted to move said catch member back to said first position when the cartridge is reinserted into the disc drive so when the cartridge is withdrawn from the disc drive the disc carrier is withdrawn from the machine along with the cartridge.

11. The disc system of claim 10 wherein said disc is an optical disc.

12. The disc system of claim 10 wherein:
said grooves segments each have entrance and exit ends;
said first and third groove segments are spiral grooves and said second and fourth groove segments are axial grooves;
said axial and spiral groove segments alternate with each other;
the entrance end of each groove segment is adjacent the exit end of the adjacent groove segment;
the entrance ends are deeper than the adjacent exit ends; and
said catch member actuator includes a spring biased guide pin having an end engaged within said circumferential cam groove, said rotatable cam member rotating in a single rotary direction because said guide pin is disabled from moving from the exit ends to the adjacent entrance ends by virtue of the differences in groove depths thereat.

13. The disc system of claim 12 wherein at least one of said second and fourth axial groove segments has a variable depth.

* * * * *